(12) United States Patent
Takeuchi et al.

(10) Patent No.: US 10,384,381 B2
(45) Date of Patent: Aug. 20, 2019

(54) HOT RUNNER NOZZLE, METAL MOLD EQUIPPED WITH HOT RUNNER NOZZLE, AND MOLDING METHOD AND MOLDED PRODUCT PROVIDED BY METAL MOLD

(71) Applicant: Nissei Plastic Industrial Co., Ltd., Hanishina-gun, Nagano-ken (JP)

(72) Inventors: Yasuhiko Takeuchi, Nagano-ken (JP); Minoru Yamazaki, Nagano-ken (JP); Yoshiharu Yanagimachi, Nagano-ken (JP); Kouichi Shimizu, Nagano-ken (JP)

(73) Assignee: Nissei Plastic Industrial Co., Ltd., Hanishina-Gun, Nagano-Ken (JP)

( * ) Notice: Subject to any disclaimer, the term of this patent is extended or adjusted under 35 U.S.C. 154(b) by 928 days.

(21) Appl. No.: 14/488,612

(22) Filed: Sep. 17, 2014

(65) Prior Publication Data

US 2015/0079321 A1    Mar. 19, 2015

(30) Foreign Application Priority Data

Sep. 17, 2013  (JP) ................................ 2013-191996

(51) Int. Cl.
*B29C 45/16*    (2006.01)
*B29C 45/20*    (2006.01)

(52) U.S. Cl.
CPC ...... *B29C 45/1603* (2013.01); *B29C 45/1634* (2013.01); *Y10T 428/1352* (2015.01)

(58) Field of Classification Search
CPC ................ B29C 2045/1614; B29C 2045/1698
See application file for complete search history.

(56) References Cited

U.S. PATENT DOCUMENTS 3,584,337 A * 6/1971 Aoki ..................... B29C 49/063
                                                        264/538
2008/0317989 A1* 12/2008 Abe ........................ B29B 11/08
                                                        428/36.9

FOREIGN PATENT DOCUMENTS

| JP | S5882232 U | 6/1983 |
| JP | H0376624 A | 4/1991 |
| JP | B1994-059672 | 8/1991 |
| JP | H06285912 A | 10/1994 |
| JP | 2006516934 A | 7/2006 |

* cited by examiner

*Primary Examiner* — Rachel Kahn
(74) *Attorney, Agent, or Firm* — Arent Fox LLP

(57) ABSTRACT

When a plurality of striped molded products are molded at a time, the molded products having a striped pattern and an outstanding design property are obtained by preventing part of molten resins from being unevenly distributed in an inappropriate manner when being fed into a cavity of a metal mold. A hot runner nozzle is provided with a first resin flow path and a plurality of second resin flow paths. The first flow path has a funnel section which continues with a nozzle gate at a centripetal position and which allows a first molten resin to be gathered at the centripetal position of the funnel section so as to feed the resin into the nozzle gate. The second resin flow paths have a plurality of corresponding discharge ports facing and communicating with the funnel section of the first resin flow path, each of the discharge ports being disposed around the centripetal position, so that the second molten resin different from the first molten resin is fed into the funnel section.

8 Claims, 13 Drawing Sheets

HOT RUNNER NOZZLE, METAL MOLD EQUIPPED WITH HOT RUNNER NOZZLE, AND MOLDING METHOD AND MOLDED PRODUCT PROVIDED BY METAL MOLD

FIELD

The present invention relates to a hot runner nozzle which is employed to produce a relatively thin striped molded product such as a cup made of a synthetic resin by injection molding. The invention also relates to a metal mold equipped with the hot runner nozzle, a molding method for forming the molded product using the metal mold, and a molded product formed by the molding method.

BACKGROUND

Some molded products made of a plastic material employ two different types of resins, and for example, have a layered structure in which one of the resins or a resin of the surface layers of the molded product (the layer on the inner surface side and the layer on the outer surface side of the molded product) is layered, while the other of the resins or the resin for the middle layer of the molded product is also layered. Those products are molded in a manner such that the resin layered as the middle layer of the molded product serves to implement an intended function, and the layer is sandwiched between the layers of the resin for the surface layers of the molded product. Among multi-layered molded products, not only those having a layered structure with two types of resins formed in three layers but also those having a layered structure with three types of resins formed in five or more layers are also commercially available.

Such molded products having a layered structure with a plurality of layers may be formed by injection molding. To this end, in a known method as disclosed in Patent Literature 1, a hot runner nozzle is used to allow a plurality of types of molten resins to flow therethrough, and the hot runner nozzle serves to merge a molten resin for the surface layers of the molded product and a molten resin for the middle layer of the molded product and feed the resulting molten resins into a metal mold for molding.

CITATION LIST

Patent Literature

Patent Literature 1: Japanese Patent Application Laid-Open No. Hei. 06-059672

SUMMARY

Technical Problem

A number of molded products each made of a plurality of types of plastic materials can be molded at a time by injection molding. In this case, the flow of molten resins fed from an injection device with the resins merged with each other may be affected, in the process in which the flow reaches each cavity of the metal mold through a runner branch on the side of the metal mold, by a bend of the runner so as to change the merge state. This may lead to a phenomenon in which part of a molten resin is unevenly distributed partially in the cavity of the metal mold when being fed therein. Such a phenomenon will occur in the same manner even if the aforementioned hot runner nozzle is provided as a nozzle for the injection device and a plurality of types of molten resins are merged with each other when being fed from the injection device.

That is, since the hot runner nozzle itself has a structure in which the resin flow paths through which multiple types of molten resins reach the nozzle gate are separately provided in the nozzle, a molten resin added to impart aesthetic features to the molded product, more specifically, a molten resin for molding a molded product designed to have a striped pattern can be also allowed to flow at the same time. However, even when a hot runner nozzle capable of forming such a striped pattern is set to the injection device for injection molding, part of the molten resins is unevenly distributed as mentioned above, so that the number of stripes to be formed cannot be achieved as expected and a color mix may possibly occur. Thus, it is not possible to solve the problem that a plurality of striped molded products cannot be molded at a time using the hot runner nozzle.

In this context, the present invention was developed in view of the aforementioned problem. The invention addresses the problem that when a plurality of striped molded products are molded at a time, part of molten resins is unevenly distributed in an unsuitable manner when being fed into a cavity of a metal mold. It is therefore an object of the invention to provide an outstanding molded product designed to have a striped pattern.

Solution to Problem

First Aspect of Invention

The present invention was developed in view of the aforementioned problem. In order to solve the aforementioned problem, the first aspect of the invention provides a hot runner nozzle which has a nozzle gate fitted to face a gate of a cavity of a metal mold for molding a molded product using a plurality of types of molten resins. The hot runner nozzle can include a first resin flow path and a plurality of second resin flow paths. The first resin flow path has a funnel section which continues with the nozzle gate at a centripetal position and which allows a first molten resin to be gathered at the centripetal position of the funnel section so as to feed the resin into the nozzle gate. The second resin flow paths have a plurality of corresponding discharge ports facing and communicating with the funnel section of the first resin flow path, each of the discharge ports being disposed around the centripetal position, and feeding a second molten resin different from the first molten resin into the funnel section.

Second Aspect of Invention

In the aforementioned invention, it is preferred to include a shut pin capable of opening and closing the aforementioned nozzle gate.

Third Aspect of Invention

Furthermore, in order to solve the aforementioned problem, the third aspect of the invention provides a metal mold having a gate of a cavity inside the metal mold for molding a molded product, wherein the hot runner nozzle of the aforementioned invention is fitted such that the nozzle gate of the hot runner nozzle faces the gate.

Fourth Aspect of Invention

Furthermore, in the aforementioned invention, it is preferred that the discharge ports of the second resin flow paths facing the aforementioned funnel section be disposed about the aforementioned centripetal position so as to be movable around the centripetal position.

Fifth Aspect of Invention

Furthermore, in order to solve the aforementioned problem, the fifth aspect of the invention provides a molding method using the metal mold of the aforementioned invention equipped with the hot runner nozzle, the molding method for molding a molded product having a first resin section made of a first molten resin and a second resin section made of a second molten resin in a circumferential direction of the molded product by feeding the first molten resin and the second molten resin through the hot runner nozzle into the cavity of the metal mold, the metal mold being equipped with a first injection device for feeding the aforementioned first molten resin into the aforementioned first resin flow path and a second injection device for feeding the aforementioned second molten resin into the aforementioned second resin flow paths, wherein the plurality of second resin flow paths are provided, so that the plurality of second resin flow paths correspond to a plurality of the second injection devices, and a feed operation of the molten resin by at least one of the second injection devices causes the second molten resin from the second resin flow path corresponding to the one of the second injection devices to be fed to the aforementioned funnel section, and the first molten resin of the first resin flow path is merged at the funnel section with the second molten resin fed in the second resin flow path by the second injection device performing the feed operation of the molten resin.

Sixth Aspect of Invention

Furthermore, in order to solve the aforementioned problem, the sixth aspect of the invention provides a molded product molded by the molding method according to the aforementioned invention, the molded product being characterized in that the aforementioned first resin section and second resin section are disposed alternately in the circumferential direction of the molded product, so that an alternately arranged pattern is exhibited.

Seventh Aspect of Invention

Furthermore, in order to solve the aforementioned problem, the seventh aspect of the invention provides a molded product molded by the molding method according to the aforementioned invention, the molded product being characterized in that the aforementioned first resin section and second resin section are disposed alternately in the circumferential direction of the molded product, so that the first resin section and the second resin section are tilted in the same direction and the alternately arranged pattern is exhibited in a twisted manner.

Advantageous Effects of Invention

Advantageous Effects of First Aspect of Invention

According to the first aspect of the present invention, the hot runner nozzle includes: the first resin flow path having the funnel section that continues with the nozzle gate at the centripetal position and allows the first molten resin to be gathered at the centripetal position of the funnel section so as to feed the resin into the nozzle gate; and the plurality of second resin flow paths which have the plurality of corresponding discharge ports facing and communicating with the funnel section of the first resin flow path, each of the discharge ports being disposed around the centripetal position, and which feed the second molten resin different from the first molten resin into the funnel section. When the hot runner nozzle is fitted to the metal mold in which formed are the runner for feeding a molten resin into the first resin flow path and the runner for feeding a molten resin into the second resin flow paths so that the gate of the cavity of the metal mold and the nozzle gate of the hot runner nozzle are opposed to each other, this configuration can produce an effect that the cavity of the metal mold and the hot runner nozzle to face each other in one-to-one correspondence even in providing a plurality of molded products at a time, and thereby a plurality of types of molten resins can be fed into the cavity of the metal mold while the resins are kept merged with each other at the nozzle gate so as to exhibit a striped pattern.

Advantageous Effects of Second Aspect of Invention

According to the second aspect of the present invention, the shut pin that can open and close the nozzle gate is included. A simplified operation of closing and opening the nozzle gate with the shut pin allows the feed of the molten resin into the cavity of the metal mold to be stopped as well as to be started.

Advantageous Effects of Third Aspect of Invention

According to the third aspect of the present invention, the gate of the cavity of the metal mold and the nozzle gate of the hot runner nozzle face each other. This produces an effect that the cavity of the metal mold and the hot runner nozzle face each other in one-to-one correspondence even in providing a plurality of molded products at a time, so that a plurality of types of molten resins can be fed into the cavity of the metal mold while the resins are kept merged with each other at the nozzle gate so as to exhibit a striped pattern.

Advantageous Effects of Fourth Aspect of Invention

According to the fourth aspect of the present invention, it is possible to allow a striped pattern bent in one direction around the molded product to appear on the circumferential surface of the molded product. This produces an effect of providing synthetic resin molded products with a novel design.

Advantageous Effects of Fifth Aspect of Invention

According to the fifth aspect of the present invention, the feed of the second molten resin flowing through the second resin flow path is controlled by the feed operation of the molten resin performed by the second injection device corresponding to the second resin flow path. This produces an effect that the arrangement and the width of the stripes of a striped pattern of the molded product can be easily changed only by changing injection conditions such as the injection timing, the number of times of intermittent injections, and the speed of feeding the molten resin in the second injection device.

Advantageous Effects of Sixth Aspect of Invention

According to the sixth aspect of the present invention, produced is an effect that an injection molding method for providing molded products provides synthetic resin molded products with a novel design.

Advantageous Effects of Seventh Aspect of Invention

According to the seventh aspect of the present invention, produced is an effect that an injection molding method for providing molded products provides synthetic resin molded products in novel designs rich in variety.

DETAILED DESCRIPTION OF INVENTION

Description of Embodiments

Figure 1:
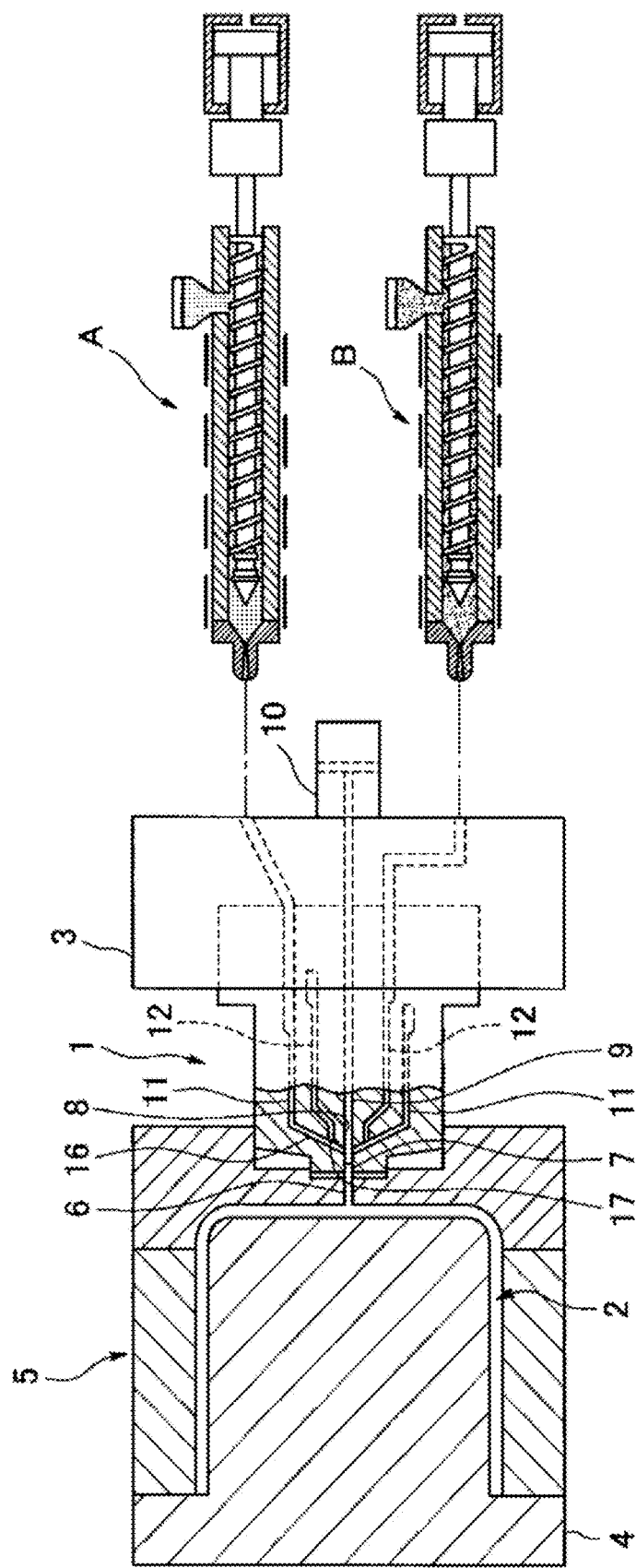
FIG. 1 is an explanatory drawing illustrating an injection molding machine which employs a hot runner nozzle of a first example according to the present invention.
Figure 2:
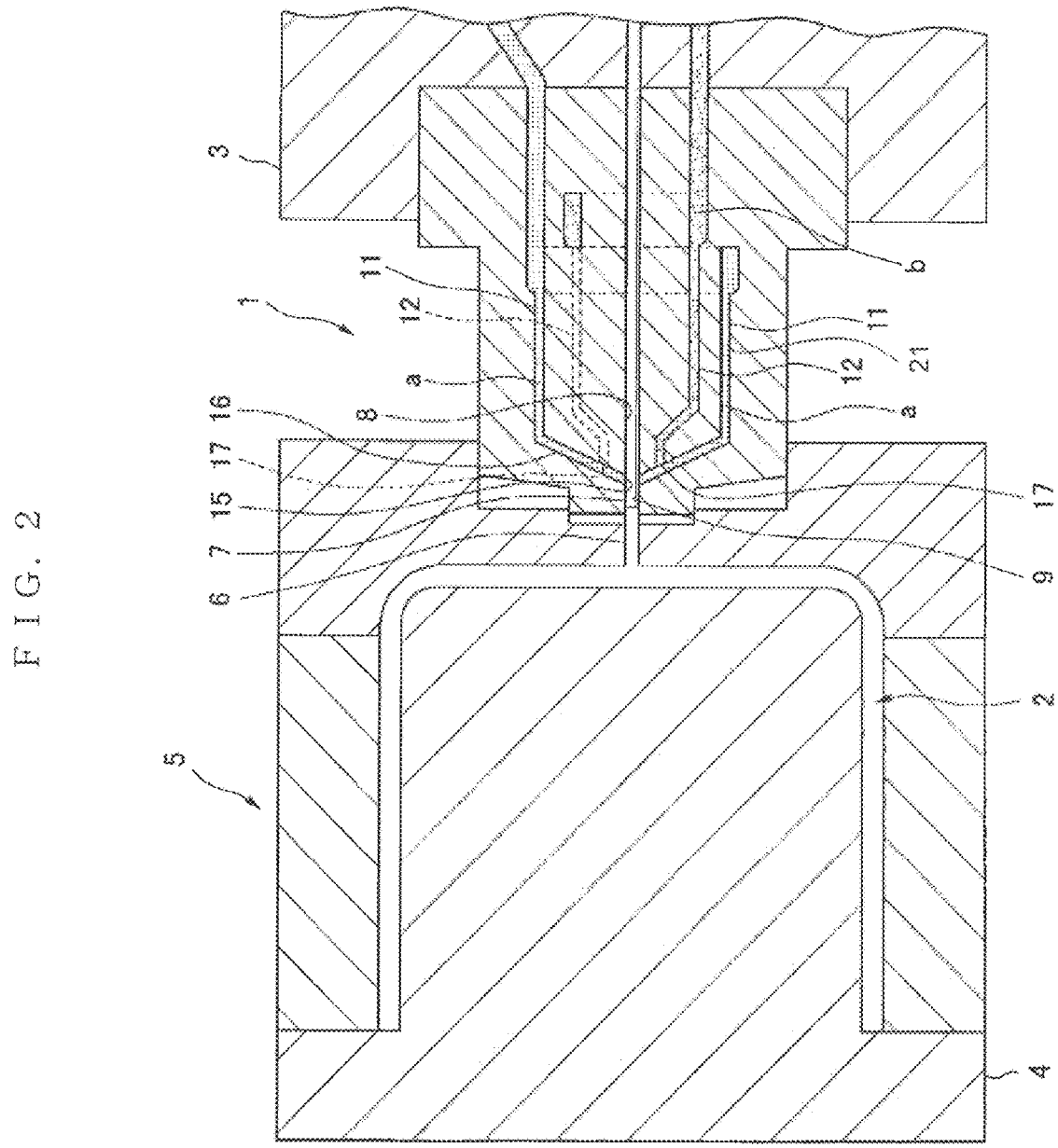
FIG. 2 is an explanatory drawing illustrating a metal mold equipped with the hot runner nozzle of the first example.

Now, the present invention will be described in more detail in accordance with the embodiments shown in FIG. 1 to FIG. 13. As shown in FIG. 1, a hot runner nozzle 1 according to the present invention is fitted to a stationary mold 3 of a metal mold 5 having a cavity 2 formed between the stationary mold 3 and a movable mold 4 for use in molding a cup-shaped molded product. The hot runner nozzle 1 is disposed so that a nozzle gate 7 of the hot runner nozzle 1 directly faces a gate 6 of the cavity 2 of the metal mold.

Metal Mold

As described above, the metal mold 5 serves to mold a cup-shaped molded product with a striped pattern. The metal mold 5 is configured such that a first resin section for forming a main part of the molded product is molded integrally with a second resin section which constitutes a part for forming a striped pattern in alignment with the first resin section. To this end, the metal mold 5 is connected with: a first injection device A which feeds a first molten resin into the hot runner nozzle 1 fitted to the stationary mold 3 so as to provide the first resin section; and a second injection device B for feeding a second molten resin to form the second resin section of which color is different from that of the first molten resin to thereby appear as a different type section. As described above, formed as shown in FIG. 1 is the injection molding machine in which the first and second injection devices A and B feed two types of molten resins, i.e., the first and second molten resins into the hot runner nozzle 1, and then the first and second molten resins are fed through the hot runner nozzle 1 into the cavity 2 of the metal mold to provide the molded product.

Nozzle of First Example: Non-Rotational

FIG. 2 to FIG. 5 show the molding by the metal mold 5 equipped with the hot runner nozzle 1 of a first example. The hot runner nozzle 1 is configured such that the nozzle gate 7 is aligned with the axial center of the nozzle 1, and a shut pin hole 8 is provided to continue to the nozzle gate 7 so that the shut pin hole 8 is also aligned with the axial center. The shut pin hole 8 receives a shut pin 9 so that the pin is movable back and forth therethrough, and the shut pin 9 is supported by a pin driving unit 10 fitted to a stationary part of the metal mold 5 and moved back and forth in the longitudinal direction of the nozzle 1 under the operation of the pin driving unit 10.

Furthermore, the hot runner nozzle 1 includes a first resin flow path 11 and a second resin flow path 12. The first resin flow path 11 is configured such that the first molten resin a that is fed through a stationary mold runner part from the aforementioned first injection device A can be fed therethrough to the nozzle gate 7. The second resin flow path 12 is configured such that the second molten resin b that is fed through the stationary mold runner part from the aforementioned second injection device B can be fed therethrough to the nozzle gate 7 while the second molten resin is merged with the first molten resin.

The aforementioned first resin flow path 11 is formed between an outer cylindrical body 13 and an inner core body 14 in a manner such that the inner core body 14 is received in the outer cylindrical body 13 having an inner surface shape tapered toward the nozzle tip on the side of the nozzle gate 7. Furthermore, as illustrated in the drawings, the first resin flow path 11 is made up of a funnel section 16 and a cylindrical section 21 which continues to the end of the funnel section 16 opposite to the nozzle gate. The funnel section 16 is provided with a discharge port 15 which is disposed at the rear end of the nozzle gate 7 and which is aligned with the circumferential surface of the aforementioned shut pin hole 8. The funnel section 16 is opened in the shape of an umbrella continuously from the discharge port 15 with the nozzle gate 7 disposed at the centripetal position, the discharge port 15 being located to face the nozzle gate 7 (i.e., the central protrusion from the funnel section 16 continues to the nozzle gate 7). The first resin flow path 11 is configured to feed the first molten resin from the first injection device to be gathered at the nozzle gate 7 serving as the centripetal position of the funnel section 16 and then fed into the cavity 2 of the metal mold.

Figure 3:
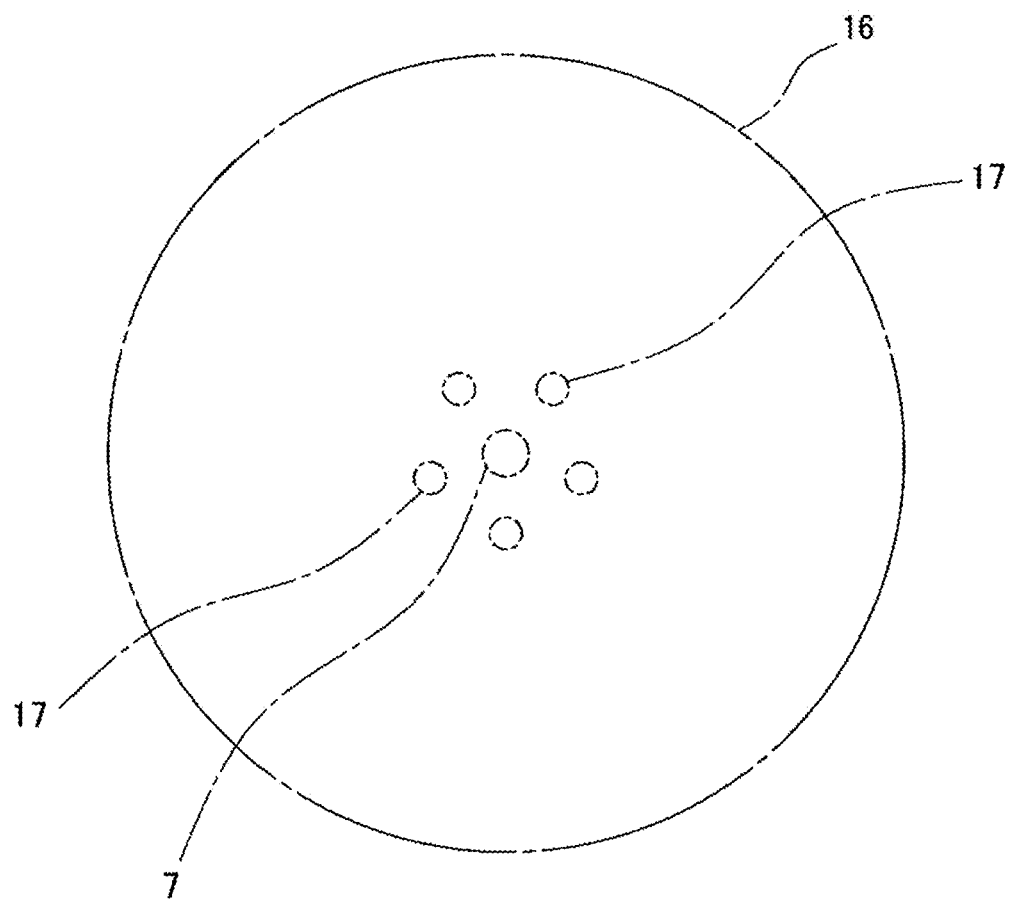
FIG. 3 is an explanatory drawing illustrating a first resin flow path funnel section and a second resin flow path discharge port in the first example.

Inside the aforementioned inner core body 14, the aforementioned second resin flow path 12 is disposed at five positions at equal intervals around the aforementioned axial center. Furthermore, the funnel section 16 of the aforementioned first resin flow path 11 faces and communicates with each discharge port 17 in a manner such that as shown in FIG. 3, five discharge ports 17 are disposed at equal intervals around the centripetal position (the position of the axial center).

As described above, since the discharge port 17 faces and communicates with the funnel section 16 of the first resin flow path 11, the second resin flow path 12 allows the second molten resin fed from the second injection device B to the nozzle gate 7 to be merged with the first molten resin at the corresponding position of the discharge port 17 of the funnel section 16. The second resin flow path 12 is configured such that the first molten resin and the second molten resin while being merged with each other are fed into the nozzle gate 7, and then, while still being merged with each other, fed into the cavity 2 of the metal mold through the nozzle gate 7.

Molding Method

Figure 4:
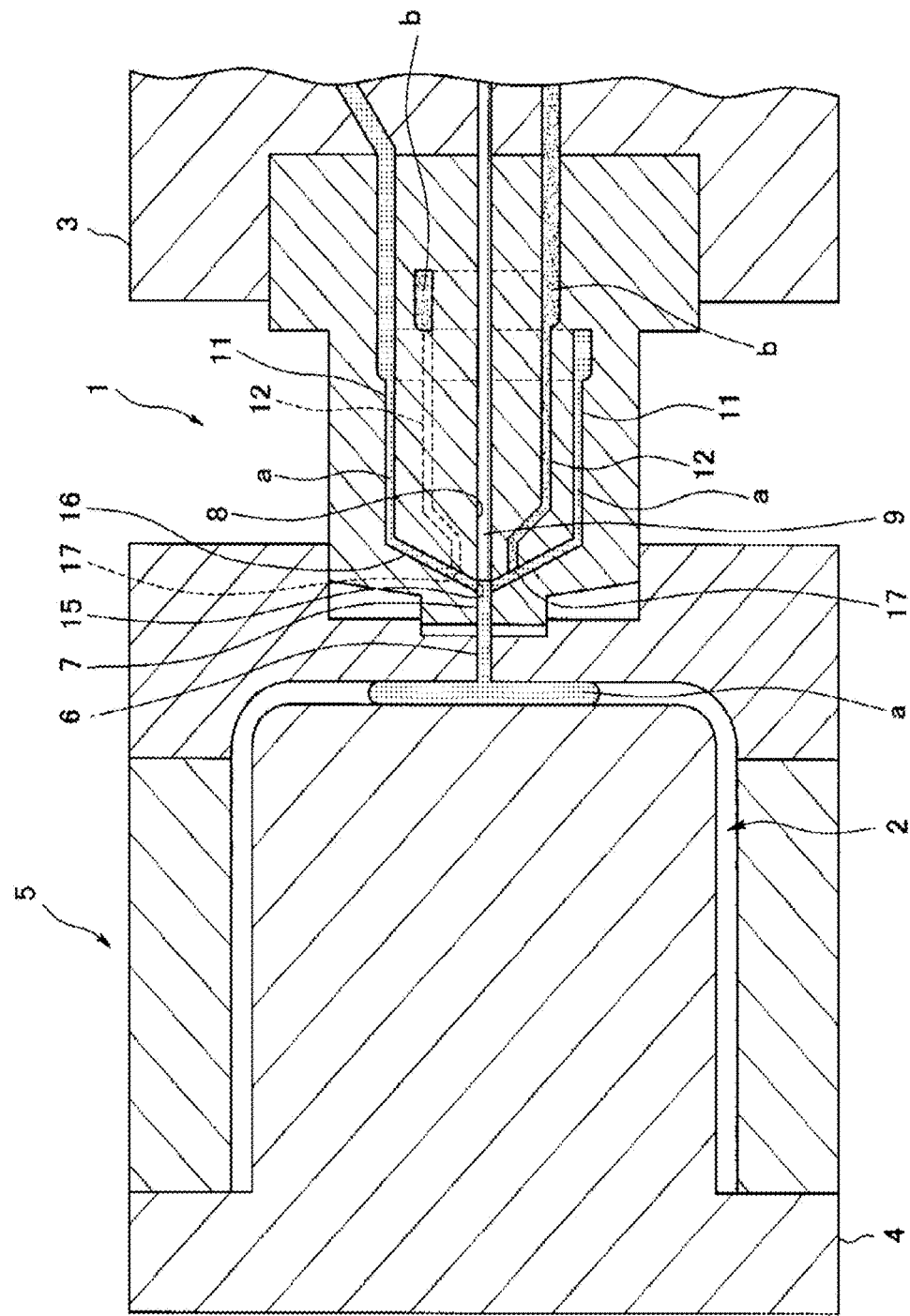
FIG. 4 is an explanatory drawing illustrating a first molten resin being fed into the metal mold which employs the hot runner nozzle of the first example.

The first molten resin and the second molten resin are fed into the metal mold 5 equipped with the aforementioned hot runner nozzle 1 so as to mold a striped molded product as follows. First, at the stage in which the pin driving unit 10 is operated to shut the nozzle gate 7 with the shut pin 9 (in the state in which the shut pin 9 has closed the discharge port 15 of the first resin flow path 11), the first injection device A applies a feed pressure to the first molten resin a. Then, at the start of molding, the shut pin 9 retreats to a position at which the discharge port 15 is opened so as to open the nozzle gate 7, thereby allowing the first molten resin a to be fed through the hot runner nozzle 1 into the cavity 2 of the metal mold. Refer to FIG. 4.

A required volume of the first molten resin a is fed into the cavity 2 of the metal mold and then the second injection device B is operated to apply a feed pressure to the second molten resin b, thereby feeding the second molten resin b through the discharge port 17. This allows the second molten resin b flowing out through the discharge port 17 to be merged with the first molten resin a flowing through the funnel section 16 of the first resin flow path 11, so that the first molten resin a and the second molten resin b are fed into the cavity 2 of the metal mold through the nozzle gate 7 while being merged with each other.

The first molten resin a and the second molten resin b are fed under pressures into the cavity 2 of the metal mold. Thus, when the merged flow reaches a portion corresponding to the gate on the core-side product surface, the first molten resin a and the second molten resin b are spread about the portion corresponding to the gate so as to expand through between the core-side product surface and the cavity-side product surface in the cavity 2 of the metal mold.

Figure 5:
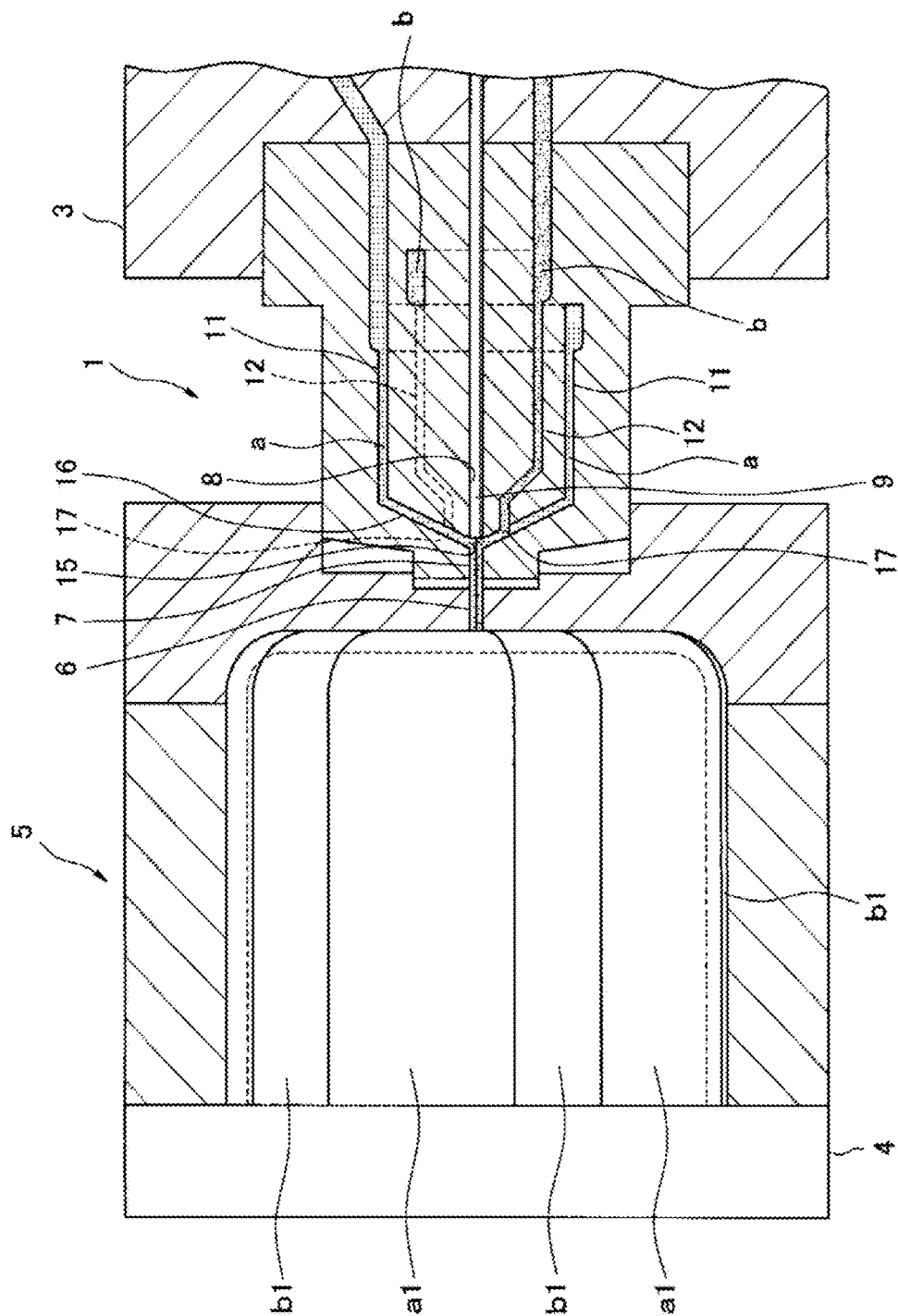
FIG. 5 is an explanatory drawing illustrating the first molten resin and a second molten resin being fed into the metal mold which employs the hot runner nozzle of the first example.
Figure 6:
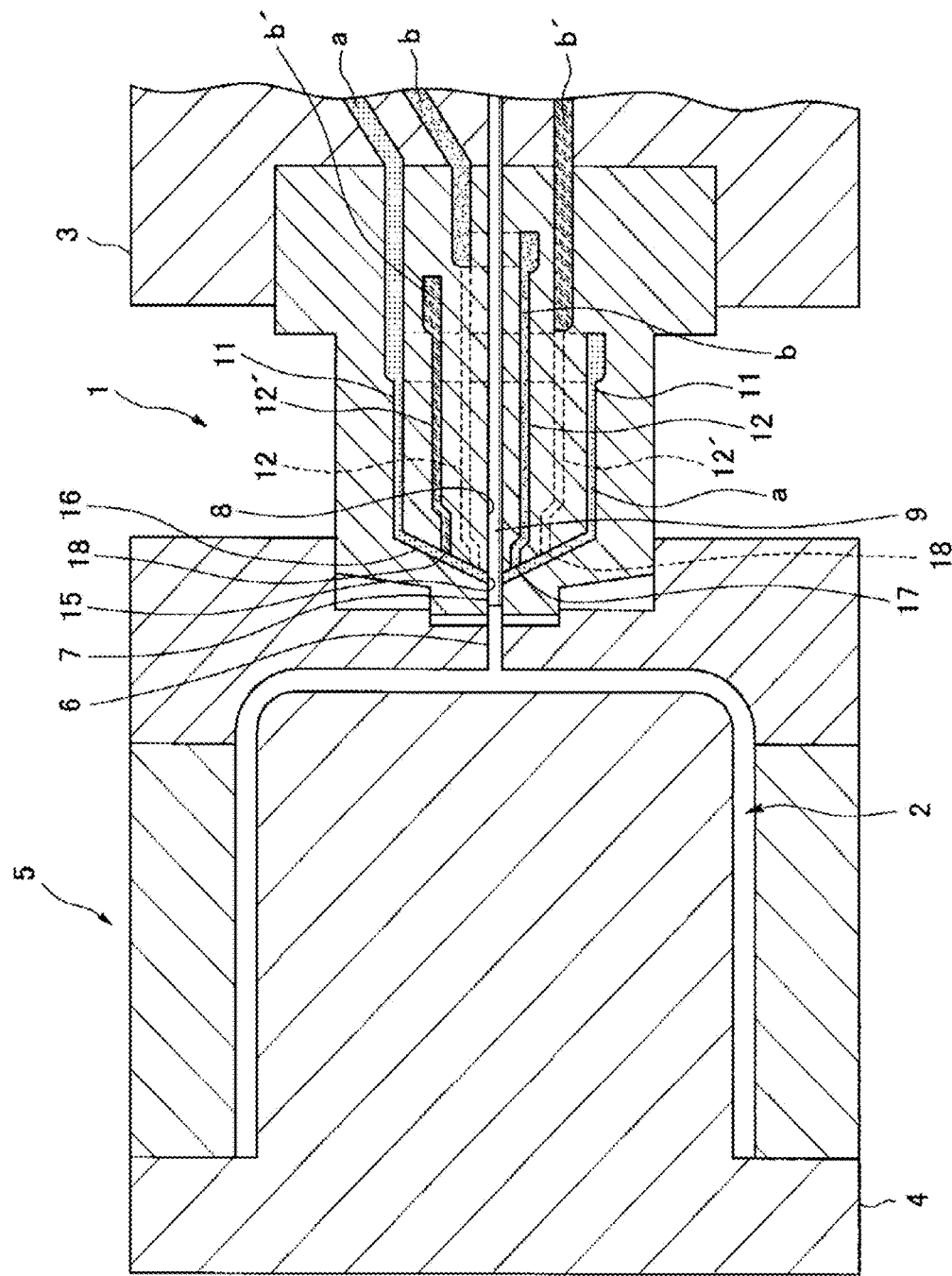
FIG. 6 is an explanatory drawing illustrating a metal mold equipped with a hot runner nozzle of a second example.

This allows a first resin section a1 made of the first molten resin a and a second resin section b1 made of the second molten resin b to be molded alternately in the circumferential direction of the molded product in the cavity 2 of the metal mold. Refer to FIG. 5.

When the required volumes of the first molten resin a and the second molten resin b have been completely fed, the pin driving unit 10 is operated to cause the shut pin 9 to move forward and shut the nozzle gate 7 (shut the discharge port 15). When the metal mold 5 is opened after that, a striped molded product is obtained which has the first resin section a1 and the second resin section b1 alternately formed in the circumferential direction of the molded product body as described above. This molded product exhibits the alternately arranged pattern.

At the point in time at which the required volumes of the first molten resin a and the second molten resin b have been completely fed, only the feed operation performed by the second injection device B has to be stopped, while the first molten resin a from the first injection device A may be continuously subjected to the feed pressure while the shut pin 9 stops feeding the resin. This example illustrates a thin cup as a cup-shaped molded product. However, molded products are not limited to this example, but as another example, it is also possible to mold, as the molded product, a preform for obtaining a PET bottle by stretch blow molding.

Nozzle of Second Example: Non-Rotational

The hot runner nozzle 1 of the aforementioned example is configured such that five second resin flow paths 12, through each of which the second molten resin b passes, are provided in the inner core body 14. However, the inner core body 14 may also be provided with a flow path through which another type of molten resin passes. Such examples are shown in FIG. 6 to FIG. 9.

Note that in the aforementioned example, the second molten resin b employed is one type of resin which is different from the first molten resin a only in color. However, the second molten resin b is not limited to one type so long as the resin can be merged with the first molten resin a and fed into the cavity of the metal mold when being formed as a molded product and the molded product can be obtained without any trouble. It is also acceptable to employ a plurality of types of second molten resins b so long as the resins can be employed to impart a striped design to the molded product. In this context, another type of molten resin employed to form a striped pattern illustrated in the second example is different in color from the two types of molten resins mentioned above.

The hot runner nozzle 1 of the second example is configured such that in the inner core body 14, five second resin flow paths 12', through which a second molten resin b' different in color from the aforementioned second molten resin b and the aforementioned first molten resin a flows, are provided so as to be located outside the second resin flow path 12 corresponding to the aforementioned second injection device B. Furthermore, like the aforementioned second resin flow path 12, the respective flow paths 12' are configured such that discharge ports 18 face the funnel section 16 to allow the second molten resin b' merged with the aforementioned first molten resin a to be fed to the nozzle gate 7, thereby allowing the funnel section 16 and each flow path 12' to communicate with each other.

Figure 7:
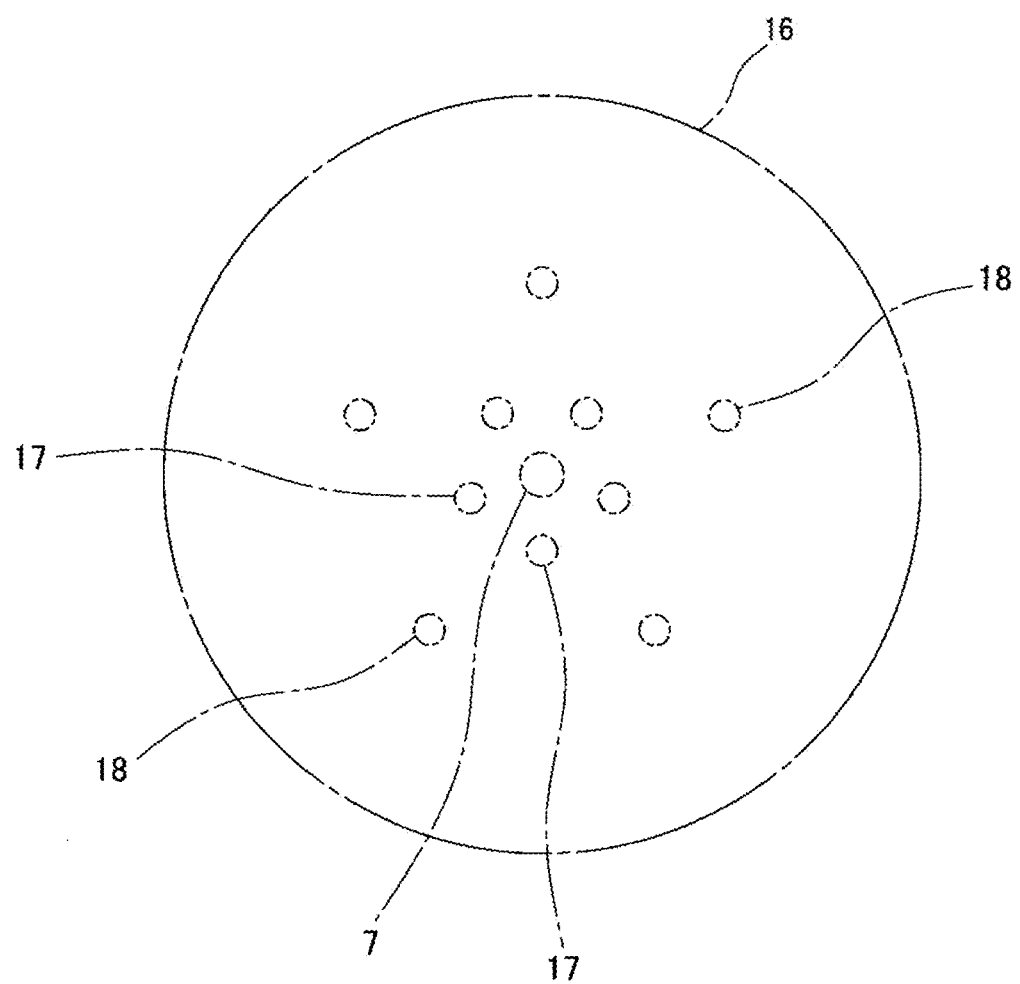
FIG. 7 is an explanatory drawing illustrating a first resin flow path funnel section and a second resin flow path discharge port in the second example.

Furthermore, as shown in FIG. 7, the discharge ports 18 are disposed outside the discharge ports 17 at equal intervals around the centripetal position, and as well shifted so that the discharge ports 18 are not located on the lines connecting between the centripetal position and the discharge ports 17 in order to prevent the second molten resin b and the second molten resin b' from overlapping each other in the funnel section 16.

Molding Method: Second Example

Figure 8:
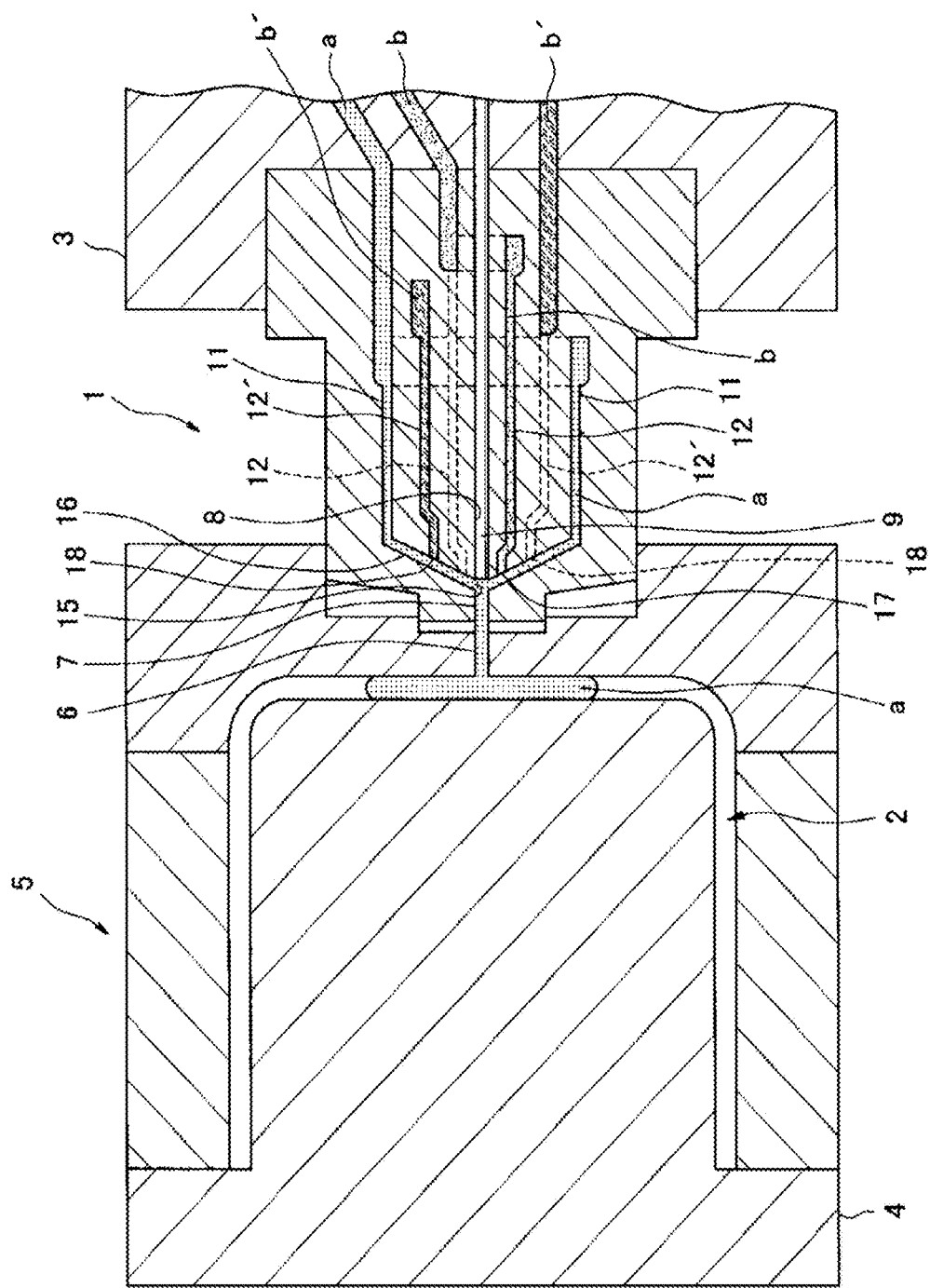
FIG. 8 is an explanatory drawing illustrating a first molten resin being fed into the metal mold which employs the hot runner nozzle of the second example.

To provide a striped molded product by feeding the first molten resin a and the second molten resins b and b' into the metal mold 5 equipped with the hot runner nozzle 1 of the second example, the first injection device A applies a feed pressure to the first molten resin a with the nozzle gate 7 closed. Then, at the start of molding, the nozzle gate 7 is opened, and the first molten resin a is fed into the cavity 2 of the metal mold through the hot runner nozzle 1 (FIG. 8). Note that at this point in time, no feed pressure is applied to other molten resins than the first molten resin a, which is the same as in the aforementioned example.

After the required volume of the first molten resin a is fed into the cavity 2 of the metal mold, the second injection device B and another second injection device (not shown) for feeding the second molten resin b' are operated to apply feed pressures to the second molten resins b and b', thereby causing the second molten resins b and b' to be fed through the discharge ports 17 and 18. This allows the second molten resins b and b' flowing out of the discharge ports 17 and 18 to be merged with the first molten resin a flowing through the funnel section 16 of the first resin flow path 11, thus causing the first molten resin a and the second molten resins b and b' to be fed, while being merged with each other, into the cavity 2 of the metal mold through the nozzle gate 7.

The first molten resin a and the second molten resins b and b' are fed under pressure into the cavity 2 of the metal mold. Thus, when the merged flow reaches a portion corresponding to the gate on the core-side product surface, the first molten resin a and the second molten resins b and b' are spread about the portion corresponding to the gate so as to expand through between the core-side product surface and the cavity-side product surface of the cavity 2 of the metal mold.

Figure 9:
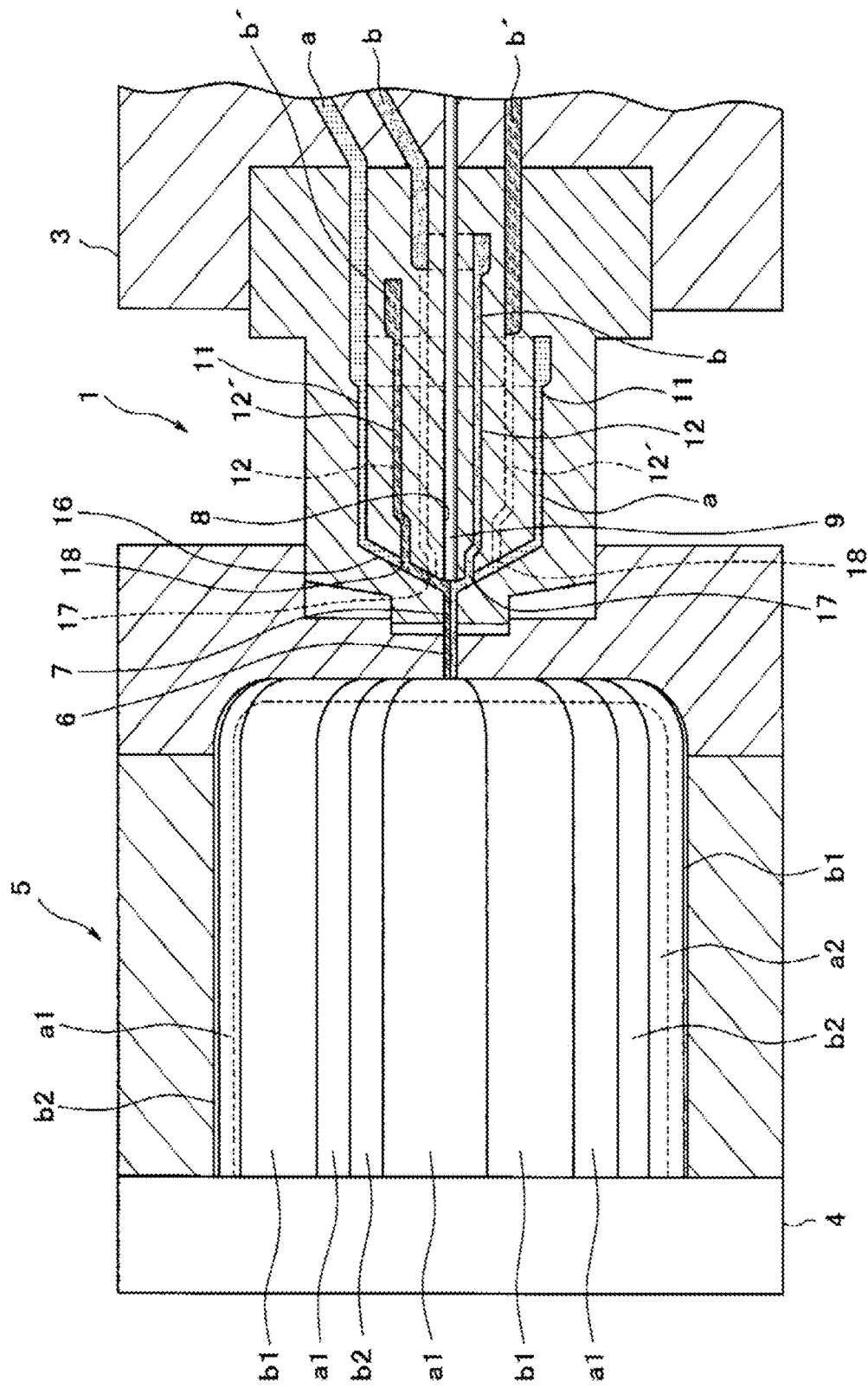
FIG. 9 is an explanatory drawing illustrating the first molten resin and a second molten resin being fed into the metal mold which employs the hot runner nozzle of the second example.

This can achieve the molding as the arrangement in which the first resin section a1 made of the first molten resin a is located between the second resin section b1 made of the second molten resin b and a second resin section b2 made of the second molten resin b' in the cavity 2 of the metal mold (FIG. 9).

When the required volumes of the first molten resin a and the second molten resins b and b' have been completely fed, the nozzle gate 7 is closed. When the metal mold is opened after that, a striped molded product is obtained which has the first resin section a1 positioned between the second resin section b1 and the second resin section b2 which are different in color from each other as described above. This molded product exhibits the alternately arranged pattern.

In the aforementioned second example, the second molten resins b and b' that are different from each other are fed at the same time by the two second injection devices operating in the same manner. However, the operation of the second injection devices is not limited to that of this example. That is, the second example employs a plurality of second resin flow paths so as to supply different molten resins, and the plurality of second resin flow paths are associated with the plurality of second injection devices. However, the plurality of second injection devices each independently can choose and change injection conditions such as the injection timing, the number of times of intermittent injections (the number of times of intermittent injections during one molding step), and the speed of feeding a molten resin.

Nozzle of Third Example: Rotational

Now, illustrated below is an example of providing a molded product on which the stripes of a striped pattern are each curved in the same direction. The resin section exhibiting the stripes of a striped pattern as described above may be molded in such a shape that is curved with respect to the direction in which the molten resin is extended in the cavity of the metal mold. To this end, inside the hot runner nozzle 1, the second resin flow path is rotated around the centripetal position of the aforementioned funnel section, that is, the axial center of the nozzle 1 passing through the position of the nozzle gate, and each discharge port of the second resin flow paths may be moved around the centripetal position of the funnel section with the centripetal position at the center.

Figure 10:
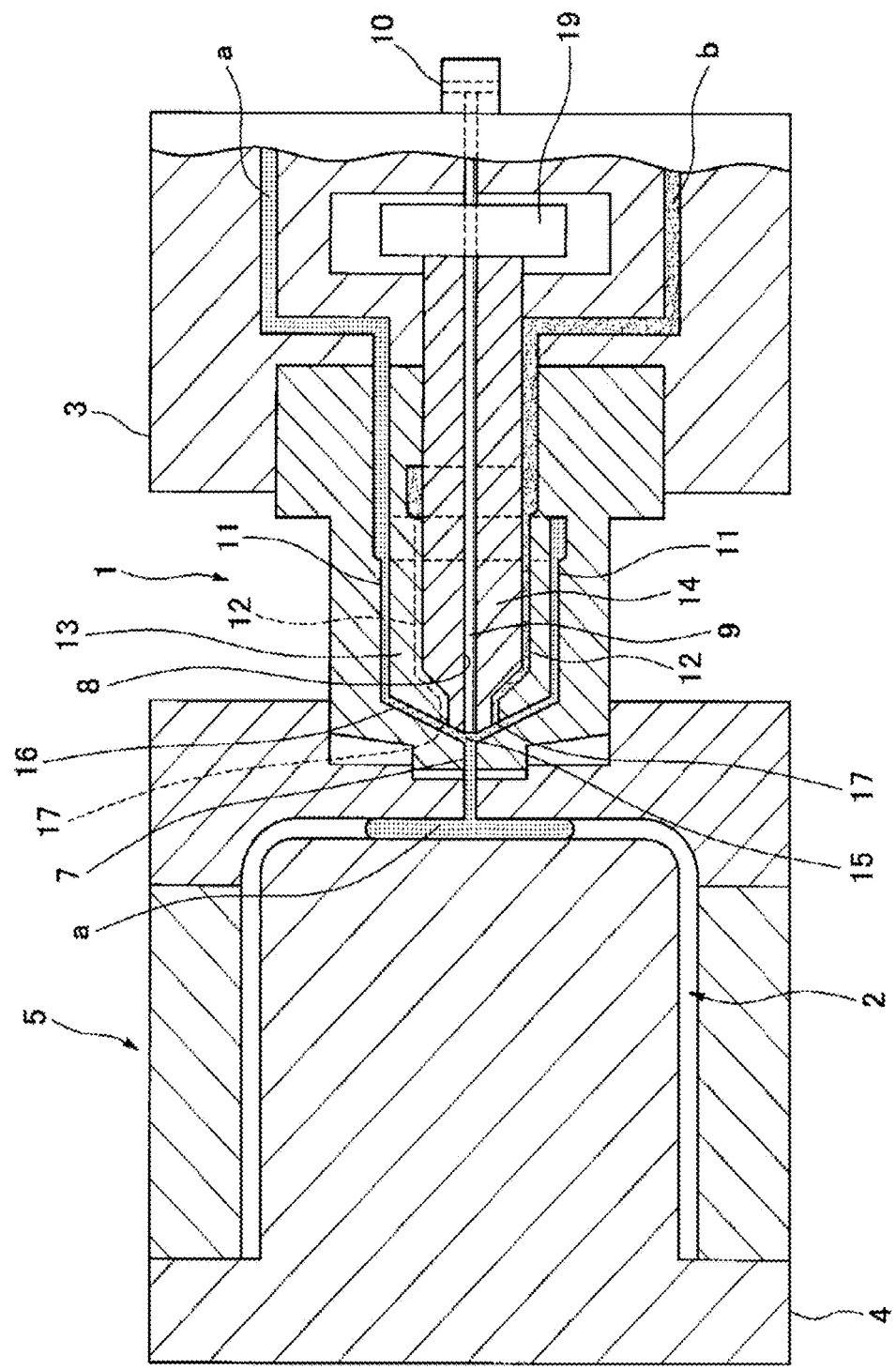
FIG. 10 is an explanatory drawing illustrating a first molten resin being fed into a metal mold which employs a hot runner nozzle of a third example.
Figure 11:
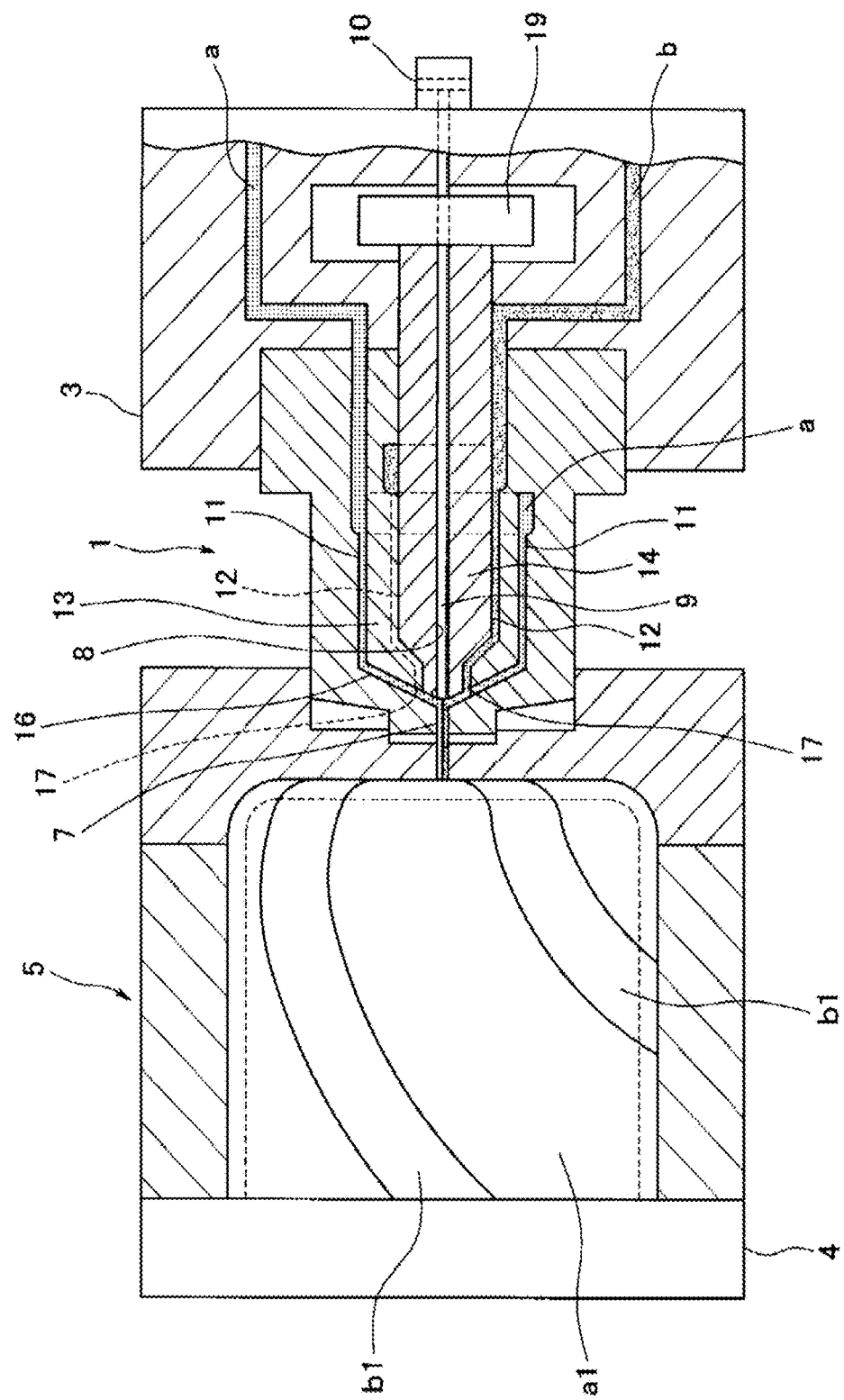
FIG. 11 is an explanatory drawing illustrating the first molten resin and a second molten resin being fed into the metal mold which employs the hot runner nozzle of the third example.

Molding by a metal mold 5 equipped with a hot runner nozzle 1 according to the third example is shown in FIG. 10 and FIG. 11. In this example, as in the aforementioned first example, the hot runner nozzle 1 includes a first resin flow path 11 for feeding a first molten resin a and five second resin flow paths 12, provided around the aforementioned axial center, for feeding the second molten resin b. Then, an inner core body 14 provided with the second resin flow paths 12 is provided rotatably about the axial center as the rotational center.

Furthermore, the aforementioned rotatable inner core body 14 is coupled to a rotation driving unit 19 which is disposed on the side of the stationary mold 3 as shown in FIG. 10, so that the rotation driving unit 19 is actuated to rotate the inner core body 14. Note that the shut pin 9 located on the center of the inner core body 14 is provided so as not to be rotated, but to perform a predetermined operation without being affected by the rotational operation of the inner core body 14.

Molding Method

To mold a striped molded product by feeding the first molten resin a and the second molten resin b into the metal mold 5 equipped with the hot runner nozzle 1 according to the third example, the first injection device A first applies a feed pressure to the first molten resin a at the stage where the nozzle gate 7 is shut. Then, at the start of molding, the shut pin 9 is moved back to a position at which the discharge port 15 is opened so as to open the nozzle gate 7, thereby feeding the first molten resin a to the cavity 2 of the metal mold through the hot runner nozzle 1. Refer to FIG. 10.

When a required volume of the first molten resin a is fed into the cavity 2 of the metal mold, the aforementioned inner core body 14 is rotated. After the inner core body 14 is rotated, the second injection device B is operated to apply a feed pressure to the second molten resin b, thereby allowing the second molten resin b to be fed through each of the discharge ports 17 that are moved about the aforementioned centripetal position.

This allows each of the second molten resin b flowing out of the discharge ports 17 to be merged with the first molten resin a flowing in a spirally curved shape through the funnel section 16 of the first resin flow path 11, so that the resulting merged resins are fed into the cavity 2 of the metal mold through the nozzle gate 7.

The first molten resin a and the second molten resin b are fed under pressure into the cavity 2 of the metal mold. Thus, when the merged flow reaches a portion corresponding to the gate on the core-side product surface, the first molten resin a and the second molten resin b are both spread in a pattern in which spiral stripes are disposed side by side about the portion corresponding to the gate, so as to expand through between the core-side product surface and the cavity-side product surface of the cavity 2 of the metal mold.

In the cavity 2 of the metal mold, both the first resin section a1 made of the first molten resin a and the second resin section b1 made of the second molten resin b are molded as such an arrangement that has a spiral striped pattern. Refer to FIG. 11.

When the required volumes of the first molten resin a and the second molten resin b have been completely fed, the pin driving unit 10 is operated to move forward the shut pin 9 so as to shut the nozzle gate 7 as well as the rotation of the inner core body 14 is stopped. When the metal mold is opened after that, a striped molded product is obtained which has the first resin section a1 and the second resin section b1 arranged in a spiral fashion as described above. This molded product is configured to have the first resin section a1 and the second resin section b1 alternately disposed in the circumferential direction of the molded product, so that the first resin section a1 and the second resin section b1 are tilted in the same direction. The alternately arranged pattern is exhibited in a twisted manner.

At the point in time at which the required volumes of the first molten resin a and the second molten resin b have been completely fed, the feeding operation of only the second injection device B and the rotational operation of the inner core body 14 may have to be stopped. On the other hand, the feeding may have to be stopped by the shut pin 9 while the first molten resin a of the first injection device A may be subjected to the continual feed pressure.

Nozzle of Fourth Example: Rotational

Figure 12:
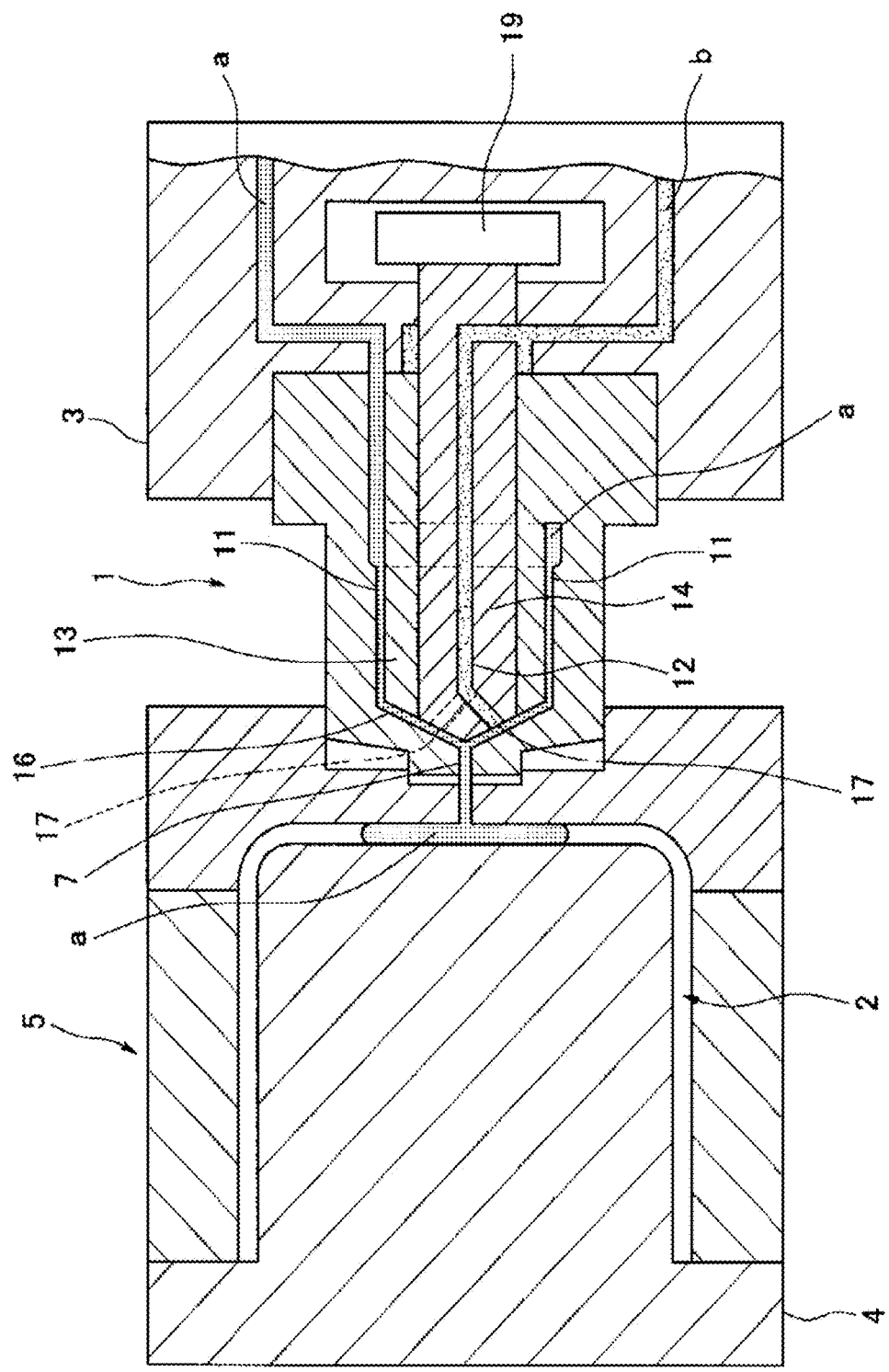
FIG. 12 is an explanatory drawing illustrating a first molten resin being fed into metal mold which employs a hot runner nozzle of a fourth example.
Figure 13:
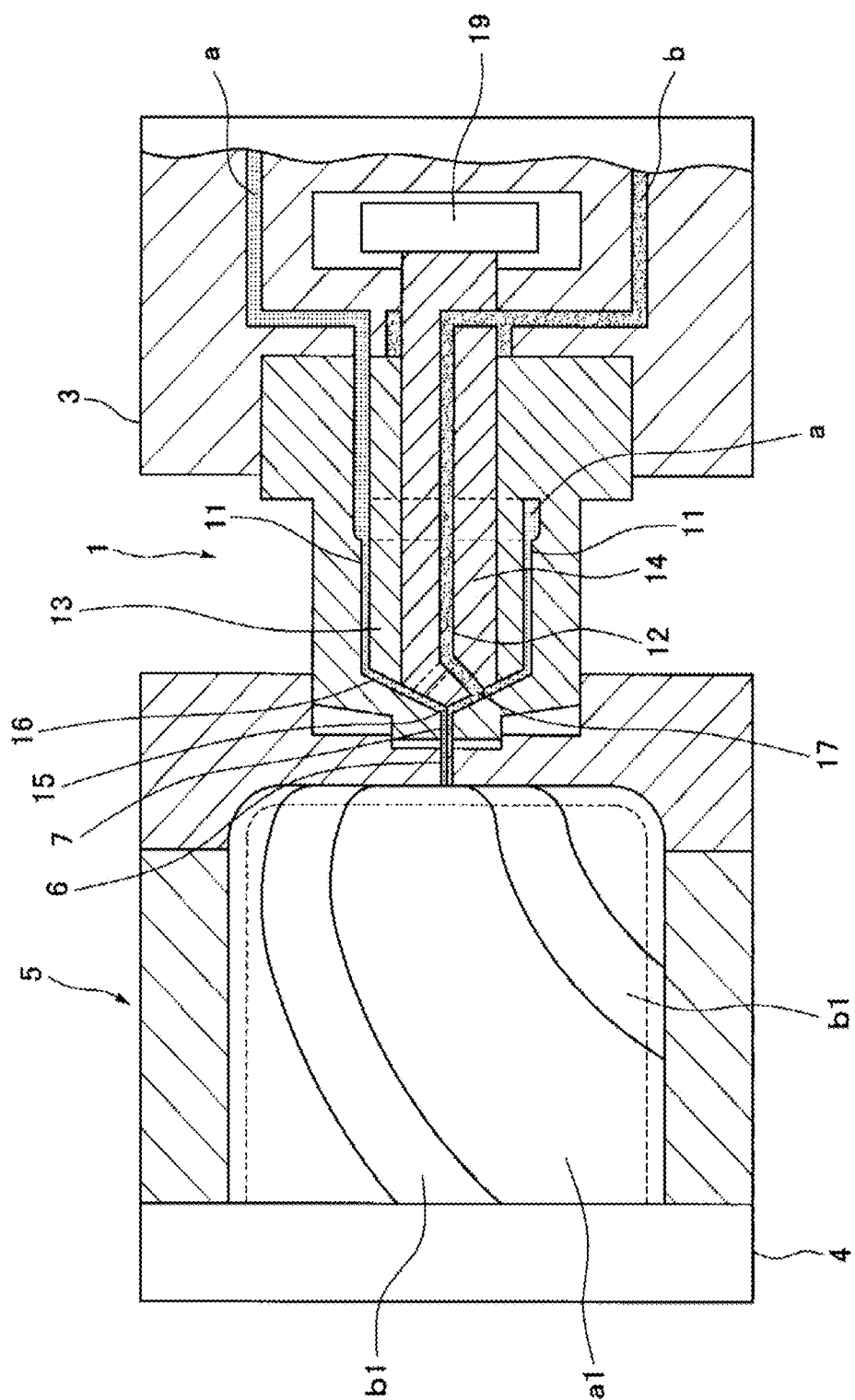
FIG. 13 is an explanatory drawing illustrating the first molten resin and a second molten resin being fed into the metal mold which employs the hot runner nozzle of the fourth example.

FIG. 12 and FIG. 13 illustrate the molding by metal mold equipped with a hot runner nozzle of a fourth example for obtaining a molded product which exhibits a spiral striped pattern as in the third example described above. As shown in FIG. 12, the hot runner nozzle 1 of the fourth example does not have the shut pin and the shut pin hole. That is, the molten resin is fed or stopped not by opening or closing the nozzle gate by the shut pin, but by adjusting the feed pressure at each injection device, that is, the first injection device and the second injection device. Or alternatively, an existing method can be used to feed or stop the molten resin. Note that in the fourth example, an adjustment is made to the feed pressure at each injection device, that is, the first injection device and the second injection device.

As shown in FIG. 12, in the hot runner nozzle 1 of the fourth example, the inner core body 14 is also coupled to the rotation driving unit 19 so as to be rotated by the operation of the rotation driving unit 19. Furthermore, the inner core body 14 is provided with the second resin flow path 12 along the axial center except the nozzle gate side. The second resin flow path 12 is branched into five paths at a portion on the nozzle gate side, so that five discharge ports 17 are disposed at equal intervals around the axial center corresponding to the centripetal position of the funnel section 16 in the same manner as in the aforementioned third example.

Molding Method

To mold a striped molded product by feeding the first molten resin a and the second molten resin b into the metal mold 5 equipped with the hot runner nozzle 1 according to the fourth example, the first injection device A starts to feed the first molten resin a while the second injection device B is stopping feeding, and feeds the first molten resin a through the nozzle gate 7 into the cavity 2 of the metal mold. Refer to FIG. 12.

When the required volume of the first molten resin a has been fed into the cavity 2 of the metal mold, the aforementioned inner core body 14 is rotated. Then, as in the same manner as in the third example, after the inner core body 14 is rotated, the second injection device B is operated to apply a feed pressure to the second molten resin b, thereby feeding the second molten resin b into the funnel section 16 through each of the aforementioned discharge ports 17 on the second resin flow paths 12.

In the same manner as in the third example, each of the second molten resin b flowing out of the discharge ports 17 is merged with the first molten resin a flowing in a spirally curved shape through the funnel section 16 of the first resin flow path 11, so that the resulting merged resins are fed into the cavity 2 of the metal mold through the nozzle gate 7. When the merged flow reaches a portion corresponding to the gate on the core-side product surface, the first molten resin a and the second molten resin b are both spread in a pattern in which spiral stripes are disposed side by side about the portion corresponding to the gate, so as to expand through between the core-side product surface and the cavity-side product surface of the cavity 2 of the metal mold.

As a result, in the same manner as in the third example, both the first resin section a1 made of the first molten resin a and the second resin section b1 made of the second molten resin b are molded as such an arrangement that has a spiral striped pattern. Refer to FIG. 13.

When the required volumes of the first molten resin a and the second molten resin b have been completely fed, the first and second injection devices A and B stop feeding the first molten resin a and the second molten resin b and the rotation of the inner core body 14 is also stopped. When the metal mold is opened after that, a striped molded product is obtained which has the first resin section a1 and the second resin section b1 arranged in a spiral fashion as described above. This molded product is configured to have the first resin section a1 and the second resin section b1 alternately disposed in the circumferential direction of the molded product, so that the first resin section a1 and the second resin section b1 are tilted in the same direction. The alternately arranged pattern is exhibited in a twisted manner.

In each of the first, third, and fourth examples, one second injection device feeds the second molten resin into the second resin flow path. However, it is not always necessary to feed the resin constantly during the feeding of the resin per one molding step. It is also possible to choose and change injection conditions such as the injection timing, the number of times of intermittent injections, and the speed of feeding the molten resin in the second injection device that feeds the resin.

REFERENCE SIGNS LIST

1 . . . hot runner nozzle
2 . . . cavity of metal mold
3 . . . stationary mold
4 . . . movable mold
5 . . . metal mold
7 . . . nozzle gate
8 . . . shut pin hole
9 . . . shut pin
11 . . . first resin flow path
12, 12' . . . second resin flow path
14 . . . inner core body
15 . . . discharge port of first resin flow path
16 . . . funnel section
17, 18 . . . discharge port of second resin flow path
A . . . first injection device
B . . . second injection device
a1 . . . first resin section
b1, b2 . . . second resin section

What is claimed is:

1. A hot runner nozzle comprising a nozzle gate fitted to face a gate of a cavity of a metal mold for molding a molded product using a plurality of types of molten resins, wherein:
the hot runner nozzle includes a first resin flow path and plurality of second resin flow paths, an outer cylindrical body, and an inner core body,
the first resin flow path has a funnel section which continues with the nozzle gate at a centripetal position and a cylindrical section which continues to the end of the funnel section opposite to the nozzle gate, so that the first resin flow path allows a first molten resin to be gathered at the centripetal position of the funnel section so as to feed the resin into the nozzle gate,
the second resin flow paths have a plurality of corresponding discharge ports facing and communicating with the funnel section of the first resin flow path, each of the discharge ports being disposed at intervals around the centripetal position, and feeding a second molten resin different from the first molten resin into the funnel section from the plurality of corresponding discharge ports;
the funnel section and cylindrical section of the first resin flow path are formed between the outer cylindrical body and the inner core body, and
the second resin flow paths are provided in the inner core body.

2. The hot runner nozzle according to claim 1, comprising a shut pin capable of opening and closing the nozzle gate.

3. A metal mold having a gate of a cavity inside the metal mold for molding a molded product, wherein the hot runner nozzle according to claim 1 is fitted such that the nozzle gate of the hot runner nozzle faces the gate.

4. A metal mold having a gate of a cavity inside the metal mold for molding a molded product, wherein the hot runner nozzle according to claim 2 is fitted such that the nozzle gate of the hot runner nozzle faces the gate.

5. The hot runner nozzle according to claim 1, wherein:
the inner core body is provided rotatably about the axial center passing through the centripetal position, and
the discharge ports of the second resin flow paths facing the funnel section are disposed about the centripetal position so as to be movable around the centripetal position.

6. A metal mold having, a gate of a cavity inside the metal mold for molding a molded product, wherein the hot runner nozzle according to claim 5 is fitted such that the nozzle gate of the hot runner nozzle faces the gate.

7. A molding method using the metal mold according to claim 3 or claim 4 equipped with the hot runner nozzle, the molding method for molding a molded product having a first resin section made of a first molten resin and a second resin section made of a second molten resin in a circumferential direction of the molded product by feeding the first molten resin and the second molten resin through the hot runner nozzle into the cavity of the metal mold, the metal mold being equipped with a first injection device for feeding the first molten resin into the first resin flow path and a second injection device for feeding the second molten resin into the second resin flow paths, wherein
a plurality of second resin flow paths are provided, so that the plurality of second resin flow paths correspond to a plurality of the second injection devices, and a feed operation of the molten resin by at least one of the second injection devices causes the second molten resin from the second resin flow path corresponding to the one of the second injection devices to be fed to the funnel section, and
the first molten resin of the first resin flow path is merged at the funnel section with the second molten resin fed in the second resin flow path by the second injection device performing the feed operation of the molten resin.

8. A molding method using the metal mold according to claim 6 equipped with the hot runner nozzle, the molding method for molding a molded product having a first resin section made of a first molten resin and a second resin section made of a second molten resin in a circumferential direction of the molded product by feeding the first molten resin and the second molten resin through the hot runner nozzle into the cavity of the metal mold, the metal mold being equipped with a first injection device for feeding the first molten resin into the first resin flow path and a second injection device for feeding the second molten resin into the second resin flow paths, wherein
a plurality of second resin flow paths are provided, so that the plurality of second resin flow paths correspond to a plurality of the second injection devices, and a feed operation of the molten resin by at least one of the second injection devices causes the second molten resin from the second resin flow path corresponding to the one of the second injection devices to be fed to the funnel section, and
the first molten resin of the first resin flow path is merged at the funnel section with the second molten resin fed in the second resin flow path by the second injection device performing the feed operation of the molten resin.

\* \* \* \* \*